(12) United States Patent
Colter

(10) Patent No.: US 6,375,563 B1
(45) Date of Patent: Apr. 23, 2002

(54) VENTILATION TEMPERATURE AND PRESSURE CONTROL APPARATUS

(76) Inventor: William C. Colter, 125 Ellis Ave., Jamestown, NY (US) 14701

( * ) Notice: Subject to any disclaimer, the term of this patent is extended or adjusted under 35 U.S.C. 154(b) by 0 days.

(21) Appl. No.: 09/694,390

(22) Filed: Oct. 23, 2000

Related U.S. Application Data

(63) Continuation of application No. 09/187,504, filed on Nov. 6, 1998, now Pat. No. 6,241,604.
(60) Provisional application No. 60/073,676, filed on Feb. 4, 1998.

(51) Int. Cl.⁷ ................................................. F24F 7/007
(52) U.S. Cl. ...................... 454/356; 236/49.3; 454/338; 454/343
(58) Field of Search ................................. 454/256, 258, 454/338, 341, 343, 356; 236/49.3

(56) References Cited

U.S. PATENT DOCUMENTS

| | | | | |
|---|---|---|---|---|
| 1,845,954 A | * | 2/1932 | Bird | 454/242 |
| 2,552,966 A | * | 5/1951 | Harp | 236/49.3 X |
| 3,557,681 A | * | 1/1971 | Svend | |
| 3,601,184 A | * | 8/1971 | Jean | 165/125 X |
| 3,611,906 A | * | 10/1971 | Jerome | |
| 5,125,571 A | * | 6/1992 | Heber | 454/343 X |
| 5,176,316 A | * | 1/1993 | Whitman | 236/44 |
| 5,257,958 A | * | 11/1993 | Jagers | 454/238 |
| 5,290,200 A | * | 3/1994 | Kiser | 454/229 |
| 5,364,026 A | * | 11/1994 | Kundert | 236/49.3 |

FOREIGN PATENT DOCUMENTS

| | | | | |
|---|---|---|---|---|
| JP | 62-147243 | * | 7/1987 | 454/343 |
| SU | 694743 | * | 10/1979 | 454/343 |

* cited by examiner

Primary Examiner—Harold Joyce
(74) Attorney, Agent, or Firm—The Bilicki Law Firm, P.C.

(57) ABSTRACT

A ventilation apparatus for a building with a roof is disclosed comprising a housing that has openings for exhausting or supplying air. The housing is fixedly secure to the building and covers an opening in the roof. A propeller fan with a motor resides in and is fixedly attached to the housing. The motor controls the fan speed and direction. The motor is controlled by a variable frequency drive that is powered by a power supply. A plurality of temperature controllers is employed to measure the indoor and outdoor temperatures. The temperature controllers operatively engage the variable frequency drive. A splash diffuser pan is fixedly attached to the roof underneath the opening in the roof. The diffuser pan must be larger in size than the opening in the roof.

9 Claims, 1 Drawing Sheet

VENTILATION TEMPERATURE AND PRESSURE CONTROL APPARATUS

RELATED U.S. PATENT DATA

This application is a continuation of and claims priority to U.S. patent application Ser. No. 09/187,504 filed Nov. 6, 1998 U.S. Pat. No. 6,241,604, U.S. patent application Ser. No. 09/187,504 is a conversion of and claims priority to U.S. Provisional Patent Application Ser. No. 60/073,676 filed Feb. 4, 1998.

FIELD OF THE INVENTION

This invention relates generally to factory ventilation control and, more specifically, to ventilation control for factories located in climates where summer ventilation with outdoor air yields acceptable factory climate conditions.

BACKGROUND OF THE INVENTION

Ventilation for factories that yields acceptable indoor climate conditions is often difficult to achieve. Various methods are practiced in the art but do not work in a cost effective and energy efficient method. Some of the various methods practiced include non-interconnected use of fuel-fired air make-up heaters, exhaust fans, "microventilation" spot cooling, door air curtains, and speed-door closures.

In industrial factories, particularly in the powder metal industry, which have a "clean" but high level of internal heat gain generated from the industrial process, excess heat causes several problems such as difficulty in maintaining positive air pressure within the factory (i.e., the atmospheric pressure within the factory is equal to or greater than the atmospheric pressure outside the factory). Generally speaking, factories need to take in air from the outside to cool the factory and facilitate combustion processes. The amount of intake air that a factory needs depends on the factory's operations and ventilation requirements. These aforementioned problems are exacerbated if the industrial factory has only a modest need for outside air intake to supply the factory's combustion and draft air because the modest intake is not sufficient to cool all of the generated excess heat. Air conditioning to counteract the excess heat is not a viable economic option because it is expensive to install, operate, and maintain.

The problems are most noticeable at the changing of the seasons. In addition to the obvious problem of keeping the factory at a comfortable temperature for the factory workers, excess heat generated from an industrial process causes other significant problems. During the warmer months when doors and windows are usually left open, the excess heat can easily be drawn away from the factory through the use of exhaust fans and gravity ventilators. However, during the cooler months when doors and windows are kept closed, use of exhaust fans or gravity ventilators causes negative pressure within the factory. Negative pressure causes particulates or combustion gases that may be contained in gravity flues are trapped within the factory. This is particularly dangerous when there is a large amount of carbon monoxide present in the factory. The negative pressure within the factory keeps the carbon monoxide within the walls of the factory, poisoning the persons inside the plant.

In addition to trapping combustion gases and particulates within the factory walls, the negative pressure in the factory causes large intakes of outside air whenever a door or window is opened. This causes large volumes of cold air to flow into the factory at the floor level that, in turn, causes a loss of temperature control in the outlying areas of the factory. Some factories use fuel-fired air heaters to make up for the building-pressure control air and to provide heat to workers in the outlying areas of the factory. These fuel-fired air heaters are expensive pieces of equipment and operate inefficiently for making up for the building's negative pressure.

SUMMARY OF THE INVENTION

This invention is a ventilation apparatus for a building with a roof. The invention generally comprises a housing that has openings for exhausting or supplying air. The housing is fixedly secured to the building and covers an opening in the roof. A propeller fan with a motor resides in and is fixedly attached to the housing. The motor controls the fan speed and direction. The motor is controlled by a variable frequency drive that is powered by a power supply. A plurality of temperature controllers is employed to measure the indoor and outdoor temperatures. The temperature controllers operatively engage the variable frequency drive. A splash diffuser pan is fixedly attached to the roof underneath the opening in the roof. The diffuser pan must be larger in size than the opening in the roof.

It is an object of this invention to provide a cost effective and energy efficient apparatus for providing overall ventilation (i.e., macroventilation) of a factory throughout the changing of the seasons.

It is an additional object of this invention to provide roof-mounted fans that exhaust excess heat from the factory in the warmer months and supply air to the factory during the cooler months.

It is also an object of this invention to exploit the natural stratification of heat wherein warm air rises to the top of a building while cool air stays close to the ground through the use of a large splash diffusion pan.

It is a further object of this invention to provide a low pressure drop for the fan as well as providing good low velocity, low draft mixing of warm and cold air streams.

It is a still further object of this invention to provide an installed apparatus that does not interfere with existing structures within the factory, including equipment that may already occupy space on the ceiling of the factory.

BRIEF DESCRIPTION OF THE DRAWING

FIG. 1 is not drawn to scale and is meant only to give a graphical representation of the invention.

DETAILED DESCRIPTION OF THE PREFERRED EMBODIMENT

Figure 1:
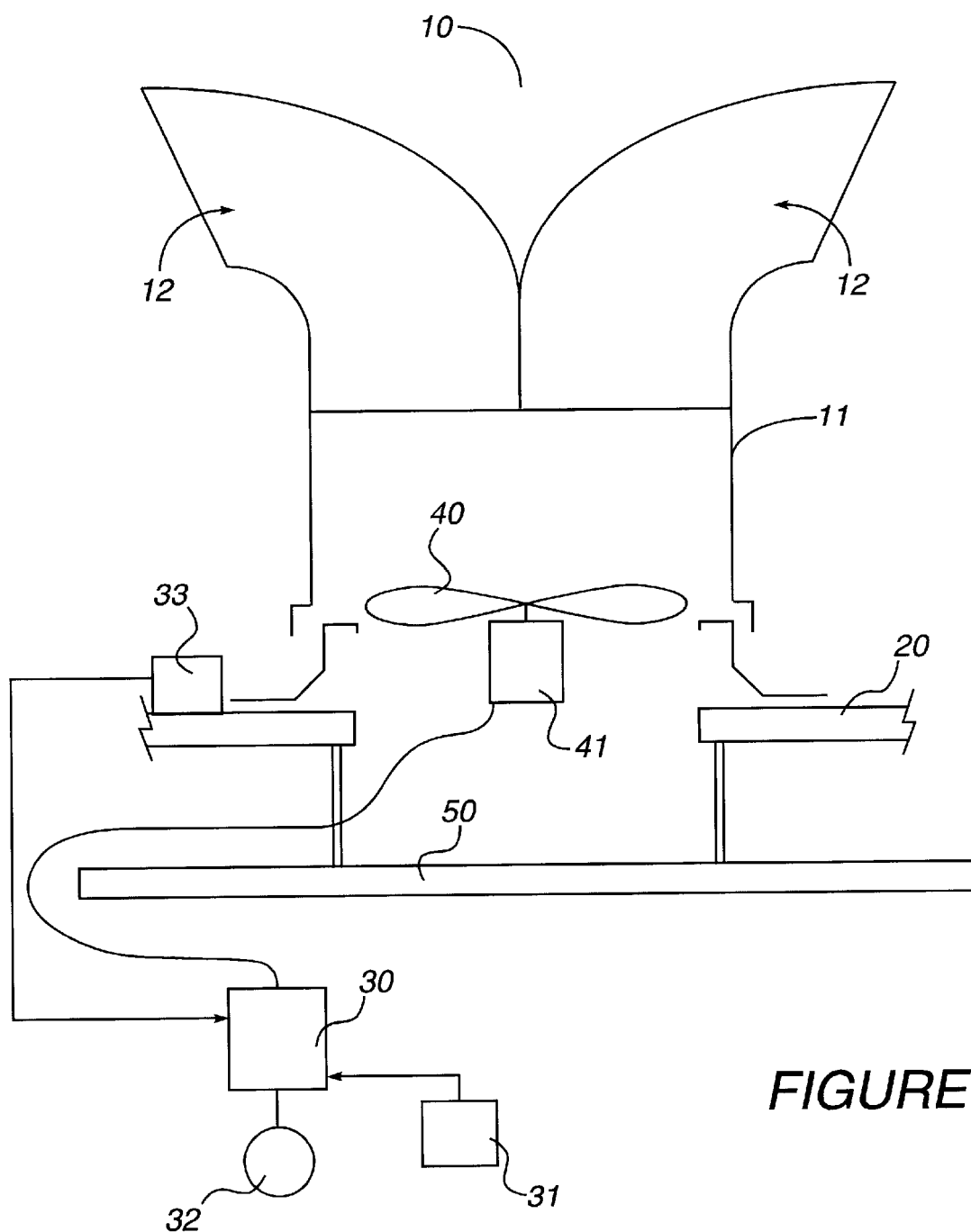
FIG. 1 illustrates the invention.

In the preferred embodiment shown in FIG. 1, the housing (11) of the invention (10) is constructed out of sheet metal with the lower portion (13) of the housing having a three-dimensional box shape. The upper portion of the housing is constructed out of sheet metal as well and may be constructed in many different shapes. The most effective shape of the upper portion is a ninety (90) degree turn elbow (12). The upper portion of the housing contains two turn elbows facing in opposite directions. Each turn elbow has a rectangular opening that is covered by a bird screen. A bird screen is a wire mesh which covers the openings and keeps birds from flying into the openings or making nests in the openings. The lower portion of the housing is attached to a roof curb through typical attachment means. The roof curb is permanently attached to the roof (20). The housing covers an opening in the roof through which air will be exhausted or supplied. The lower portion of the housing has the same dimensions as the roof opening. It should be noted that while the housing is an element of the preferred embodiment; in other embodiments, the housing may have many different shapes, if such a housing is necessary at all.

In the preferred embodiment, the roof opening is in the shape of a square. The dimensions of the square are determined by the diameter of the propeller fan (40) and must be slightly larger than the size of the propeller. For example, if the propeller size is forty-eight (48) inches; than the size of the roof opening should be approximately fifty-eight (58) inches by fifty-eight (58) inches.

The propeller fan (40) and motor (41) reside in the housing and are permanently attached to the housing through typical means used by a fan manufacturer such as the fan frame and motor mounting base described by Hartzell. The propeller fan should be of industrial grade and can have a range of diameter sizes from forty-eight (48) inches to seventy-two (72) inches. It should be noted that the size of the propeller fan could be larger than seventy-two (72) inches dependent on the needs of the particular factory or situation. The size of the fan is determined from an analysis of the maximum amount of air which the fan will be expected to exhaust or supply. The fan should be able to reverse directions as described by the Hartzell Series 09 or Series 10 brochures. The fan should be cast so that the fan operates more efficiently in one direction and so that the fan can be operated continuously. The motor that accompanies the fan can range in horsepower from five (5) to ten (10) HP based on the size of the fan that the motor should rotate. The motor and the fan are typically provided as one piece from a manufacturer. The fan and motor are supported within the housing by the fan frame and motor mounting base that is permanently attached to the housing.

The variable frequency drive (30) is a typical three phase, AC powered, reversing direction drive. A representative of such a drive is exemplified by the ACS five-hundred (500) Series from ABB Drives. The variable frequency drive is connected to the motor of the fan and modulates the speed and of the fan and switches the direction of the fan. The variable frequency drive is powered through a four hundred and sixty (460) volt, three (3) phase power supply (32) which is typically found within a factory setting.

The variable frequency drive can be controlled both manually and electronically. If controlled manually, an operator must measure both the outdoor and indoor temperatures, then make adjustments to the speed and direction of the fan based upon the temperature measurements.

Preferably, the variable frequency drive is electronically manipulated by a pair of temperature controllers (31 and 33). One temperature controller (33) is located outside the building to measure the outdoor temperature. The other temperature controller (31) is located inside the factory to continuously measure the indoor temperature. Both temperature controllers are connected to the variable frequency drive. The indoor temperature controller manipulates the variable frequency drive to modulate the speed of the fan. If the fan is in the supply direction and the indoor temperature is cool, the fan will rotate slowly. If the indoor temperature is warm while the fan is in the supply direction, the fan will rotate quickly. If the fan is in the exhaust direction, the warmer the indoor temperature, the faster the fan will rotate to exhaust the warm air.

The outdoor temperature controller manipulates the variable frequency drive to control the direction, whether exhaust or supply, of the fan. When the outdoor temperature controller reaches a predetermined comfort temperature, the controller will manipulate the drive to switch the direction of the fan from exhaust to supply when the seasons change from warm to cool and from supply to exhaust when the seasons change from cool to warm.

The preferred embodiment also utilizes a splash diffuser pan. The pan serves two functions. The first function is to catch any moisture that may be brought in when the fan is supplying air to the factory. The second function is to provide a low-pressure drop, low velocity area for the cold supplied air to diffuse into the heated air inside the factory. The air which most needs to be cooled is adjacent to the ceiling of the factory where the diffuser pan is located as well. The air will diffuse over the ends of the pan and mix with and through the temperature stratified layers of air inside the factory. This method of cooling exploits the natural temperature stratification that occurs when a temperature differential exists.

The pan must be larger in size than the roof opening. Preferably, the pan will stretch beyond the dimensions of the roof opening by at least two (2) feet in each dimension. For example, if the roof opening is fifty-eight (58) inches by fifty-eight (58) inches, the pan will be at least nine (9) feet by nine (9) feet. The pan has a depth of approximately two (2) to three (3) inches. The pan is suspended approximately three (3) to four (4) feet from the ceiling by a plurality of angle iron hooks.

To adequately ventilate an entire factory, it is obvious that more than one of the above-described ventilation control apparatuses will be utilized. In determining the number of apparatus to use, the designer must account for the heat gain realized inside the factory from the industrial process and determine the amount of cool air needed to maintain a constant factory temperature. This amount of air will have an effect on the fan size, roof opening size, and housing size as well.

Although the invention is described by reference to specific preferred embodiments, it is clear that variations can be made without departing from the spirit of the invention as claimed.

What I claim is:

1. A ventilating apparatus for a building with a roof, comprising:

a roof having openings for exhausting or supplying air;

a reversible direction propeller fan having a motor, said fan and motor fixedly secured to said roof, said motor controlling the fan speed and direction;

a reversible direction variable frequency drive electronically interfacing with the motor of the fan to control the speed and the direction of said fan wherein the direction of the variable frequency drive matches the direction of the fan;

a diffuser pan fixedly secured to a ceiling of the building underneath the opening in the roof of the building, said diffuser pan being larger in size than the opening in the roof of the building;

a power supply for the variable frequency drive;

a first temperature control apparatus operatively engaging said variable frequency drive and controlling the direction of said drive, said first temperature control apparatus measuring the outdoor temperature; said first temperature control apparatus changing the direction of said drive when the outdoor temperature reaches a preset level; and, a second temperature control apparatus operatively engaging said variable frequency drive and controlling the speed of said drive, said second temperature control apparatus measuring the indoor temperature; said second temperature control apparatus altering the speed of said drive dependent on the measured indoor temperature.

2. A ventilating apparatus according to claim 1 further comprising a housing; said housing having openings for exhausting or supplying air; said housing being fixedly secured to the building and covering an opening in the roof of the building and wherein said fan and motor reside in said housing and are fixedly attached to said housing.

3. A ventilating apparatus according to claim 1 wherein the variable frequency drive may be controlled manually.

4. A ventilating apparatus according to claim 1 wherein the size of the motor and the size of the variable frequency drive are chosen dependent on the size of the propeller fan.

5. A ventilating apparatus according to claim 1 wherein the variable frequency drive is a three-phase, AC powered drive.

6. A ventilating apparatus according to claim 2 wherein the housing dimensions are larger the size of the propeller fan.

7. A ventilating apparatus according to claim 1 wherein the apparatus can be operated either manually or electronically.

8. A ventilating apparatus for a building with a roof, comprising:
- a roof having openings for exhausting or supplying air;
- a housing; said housing having openings for exhausting or supplying air; said housing being fixedly secured to the building and covering the opening in the roof of the building;
- a propeller fan having a motor, said fan and motor residing in said housing and fixedly secured to said housing, said motor controlling the fan speed and direction;
- a variable frequency drive electronically interfacing with the motor of the fan, said variable frequency drive being a three-phase, AC powered, reversing direction drive;
- a splash diffuser pan fixedly secured to a ceiling of the building underneath the opening in the roof of the building, said diffuser pan being larger in size than the opening in the roof of the building;
- a power supply for the variable frequency drive;
- a first temperature control apparatus operatively engaging said variable frequency drive and controlling the direction of said drive, said first temperature control apparatus measuring the outdoor temperature; said first temperature control apparatus changing the direction of said drive when the outdoor temperature reaches a preset level; and,
- a second temperature control apparatus operatively engaging said variable frequency drive and controlling the speed of said drive, said second temperature control apparatus measuring the indoor temperature; said second temperature control apparatus altering the speed of said drive dependent on the measured indoor temperature.

9. A ventilation system for a building having a roof comprising:
- a plurality of ventilation apparatus comprising a roof having openings for exhausting or supplying air; each of said ventilation apparatus including,
- a reversible direction propeller fan having a motor, said fan and motor fixedly secured to said roof, said motor controlling the fan speed and direction;
- a reversible direction variable frequency drive electronically interfacing with the motor of the fan to control the speed and the direction of said fan wherein the direction of the variable frequency drive matches the direction of the fan;
- a diffuser pan fixedly secured to a ceiling of the building underneath the opening in the roof of the building, said diffuser pan being larger in size than the opening in the roof of the building;
- a power supply for the variable frequency drive;
- a first temperature control apparatus operatively engaging said variable frequency drive and controlling the direction of said drive, said first temperature control apparatus measuring the outdoor temperature; said first temperature control apparatus changing the direction of said drive when outdoor temperature reaches a preset level; and,
- a second temperature control apparatus operatively engaging said variable frequency drive and controlling the speed of said drive, said second temperature control apparatus measuring the indoor temperature; said second temperature control apparatus altering the speed of said drive dependent on the measured indoor temperature.

* * * * *